United States Patent
Kang

(10) Patent No.: US 7,865,651 B2
(45) Date of Patent: *Jan. 4, 2011

(54) MULTI-PROTOCOL SERIAL INTERFACE SYSTEM

(75) Inventor: Hee Bok Kang, Daejeongwangyeok-si (KR)

(73) Assignee: Hynix Semiconductor Inc., Icheon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/494,169

(22) Filed: Jun. 29, 2009

(65) Prior Publication Data

US 2009/0265499 A1      Oct. 22, 2009

Related U.S. Application Data

(63) Continuation of application No. 11/087,837, filed on Mar. 24, 2005, now Pat. No. 7,555,589.

(30) Foreign Application Priority Data

Apr. 20, 2004   (KR) .................... 10-2004-0027071

(51) Int. Cl.
  *G06F 3/00*   (2006.01)
  *G06F 13/14*  (2006.01)
  *G06F 9/00*   (2006.01)
  *H03K 19/173* (2006.01)

(52) U.S. Cl. .................. 710/305; 710/10; 713/1; 326/138

(58) Field of Classification Search .......... 710/305, 710/10; 713/1; 326/38
See application file for complete search history.

(56) References Cited

U.S. PATENT DOCUMENTS

| 5,737,711 | A | 4/1998 | Abe |
| 6,272,594 | B1 | 8/2001 | Gupta et al. |
| 6,349,346 | B1 | 2/2002 | Hanrahan et al. |
| 6,351,809 | B1 * | 2/2002 | St. Pierre et al. ............... 713/1 |
| 6,362,649 | B1 | 3/2002 | McGowan |
| 6,363,439 | B1 | 3/2002 | Battles et al. |
| 6,438,738 | B1 | 8/2002 | Elayda |

(Continued)

FOREIGN PATENT DOCUMENTS

JP     2002-318783 A    10/2002

(Continued)

*Primary Examiner*—Paul R Myers
*Assistant Examiner*—Christopher A Daley
(74) *Attorney, Agent, or Firm*—Townsend and Townsend and Crew LLP

(57) ABSTRACT

A multi-protocol serial interface system comprises a multi-protocol port pin array, a transport protocol change FPGA, a pull-up change FPGA and a memory. The multi-protocol port pin array comprises a plurality of port pins which interface with an external system for exchanging data with the external system. The transport protocol change FPGA determines roles of port pins of the multi-protocol port pin array depending on a variably changed protocol by selecting one of the plurality of programmed transport protocol circuits in response to code data. The pull-up change FPGA regulates pull-up load of the port pins corresponding to the roles of the port pins determined in the transport protocol change FPGA. The memory stores data processed in the transport protocol change FPGA unit and exchanged with the external system.

18 Claims, 10 Drawing Sheets

U.S. PATENT DOCUMENTS

| | | | |
|---|---|---|---|
| 6,480,026 B2 * | 11/2002 | Andrews et al. | 326/39 |
| 6,573,748 B1 | 6/2003 | Trimberger | |
| 6,705,527 B1 | 3/2004 | Kelly et al. | |
| 6,721,872 B1 | 4/2004 | Dunlop et al. | |
| 6,762,621 B1 | 7/2004 | El-Ayat | |
| 6,797,998 B2 | 9/2004 | Dewey et al. | |
| 7,000,056 B2 * | 2/2006 | Poisner | 710/305 |
| 7,024,653 B1 | 4/2006 | Moore et al. | |
| 7,069,346 B2 * | 6/2006 | Lee | 709/250 |
| 7,098,685 B1 | 8/2006 | Agrawal et al. | |
| 7,106,103 B2 | 9/2006 | Smith et al. | |
| 2002/0114200 A1 | 8/2002 | Bal | |
| 2005/0030801 A1 | 2/2005 | Perroni et al. | |
| 2005/0052895 A1 | 3/2005 | Kang | |
| 2006/0100812 A1 | 5/2006 | Sturges et al. | |

FOREIGN PATENT DOCUMENTS

| | | |
|---|---|---|
| JP | 2004-227762 | 12/2004 |

* cited by examiner

MULTI-PROTOCOL SERIAL INTERFACE SYSTEM

CROSS-REFERENCES TO RELATED APPLICATIONS

The present application is a continuation of U.S. patent application Ser. No. 11/087,837, filed Mar. 24, 2005, which claims priority to Korean patent application number 10-2004-0027071, filed Apr. 20, 2004, both of which are incorporated by reference in their entirety.

BACKGROUND OF THE INVENTION

1. Field of the Invention

The present invention generally relates to an interface system, and more specifically, to a multi-protocol serial interface system comprising a field protocol gate array (hereinafter, referred to as "FPGA") to variably change roles of port pins connected to an external system in transmission/reception of serial data, which is applied in common to different types of serial communication.

2. Background of the Related Art

In general, various transport protocols such as a universal serial bus (hereinafter, referred to as "USB") method, an ISO standard smart card method and etc. have been used in a serial data transmission/reception method. Each protocol having different roles interfaces with the external system through differently arranged port pins to transmit/receive data.

FIG. 1 is a diagram illustrating arrangement of port pins according to a USB method in the prior art.

In a USB method, a port pin array 10 comprises a VCC pin 12 for power supply, a GND pin 14 for ground, and D1 and D2 pins 16 for exchanging data. Each pin is connected through a port pin bus 18 to a corresponding terminal of a USB protocol processor 20.

FIG. 2 is a diagram illustrating arrangement of port pins according to an ISO standard smart card method in the prior art.

In an ISO standard smart card method, a port pin array 30 comprises a VCC pin 12 for power supply, a GND pin 14 for ground, a RST pin 32 for reset regulation, a CLK pin 34 for a clock pulse and an input/output (hereinafter, referred to as "I/O") pin 36. Each pin is connected through a port pin bus 38 to a corresponding terminal of an ISO standard smart card protocol processor 40.

However, in systems to which different kinds of transport protocols are applied, other pins than the VCC pin 12 for power supply and the GND pin 14 for ground have different roles, and the arrangement of the pins is different.

Therefore, each of the conventional systems comprises an exclusive processor for processing only a protocol corresponding to a port pin array which is suitable for the applied protocol. As a result, in order to process a plurality of protocols, the system requires a plurality of processors for processing each protocol and a plurality of port pin arrays corresponding to each protocol. Additionally, the manufacturing process of the conventional system was difficult and the manufacturing cost was high.

SUMMARY OF THE INVENTION

Accordingly, it is an object of the present invention to provide a multi-protocol serial interface system to variably regulate roles of port pins connected to an external system in transmission/reception of serial data using a FPGA, which is applied to various kinds of protocols.

In an embodiment, a multi-protocol serial interface system comprises a multi-protocol port pin array, a transport protocol change FPGA and a pull-up change FPGA. The multi-protocol port pin array comprises a plurality of port pins that interface with an external system for exchanging data with the external system. The transport protocol change FPGA is preconfigured with a plurality of different transport protocols, and when one transport protocol is selected, the transport protocol change FPGA is connected with the port pins of the multi-protocol port pin array depending on the selected protocol. The pull-up change FPGA regulates pull-up load of the port pins connected with the transport protocol change FPGA.

In an another embodiment, a multi-protocol serial interface system comprises a multi-protocol port pin array, a plurality of protocol change FPGA, a plurality of registers and a pull-up change FPGA. The multi-protocol port pin array comprises a plurality of port pins that interface with an external system for exchanging data with the external system. Each of the plurality of protocol change FPGAs is preconfigured with a different protocol gate array logic circuit, and one of the protocol change FPGAs is selected to process data received through the port pins of the multi-protocol port pin array. The plurality of registers connect the port pins interfacing with the external system among the port pins of the multi-protocol port pin array with the selected protocol change FPGA. The pull-up change FPGA regulates pull-up load of the port pins connected with the transport protocol change FPGA.

BRIEF DESCRIPTION OF THE DRAWINGS

Other aspects and advantages of the present invention will become apparent upon reading the following detailed description and upon reference to the drawings in which.

DETAILED DESCRIPTION OF THE PREFERRED EMBODIMENTS

The present invention will be described in detail with reference to the accompanying drawings.

Figure 1:
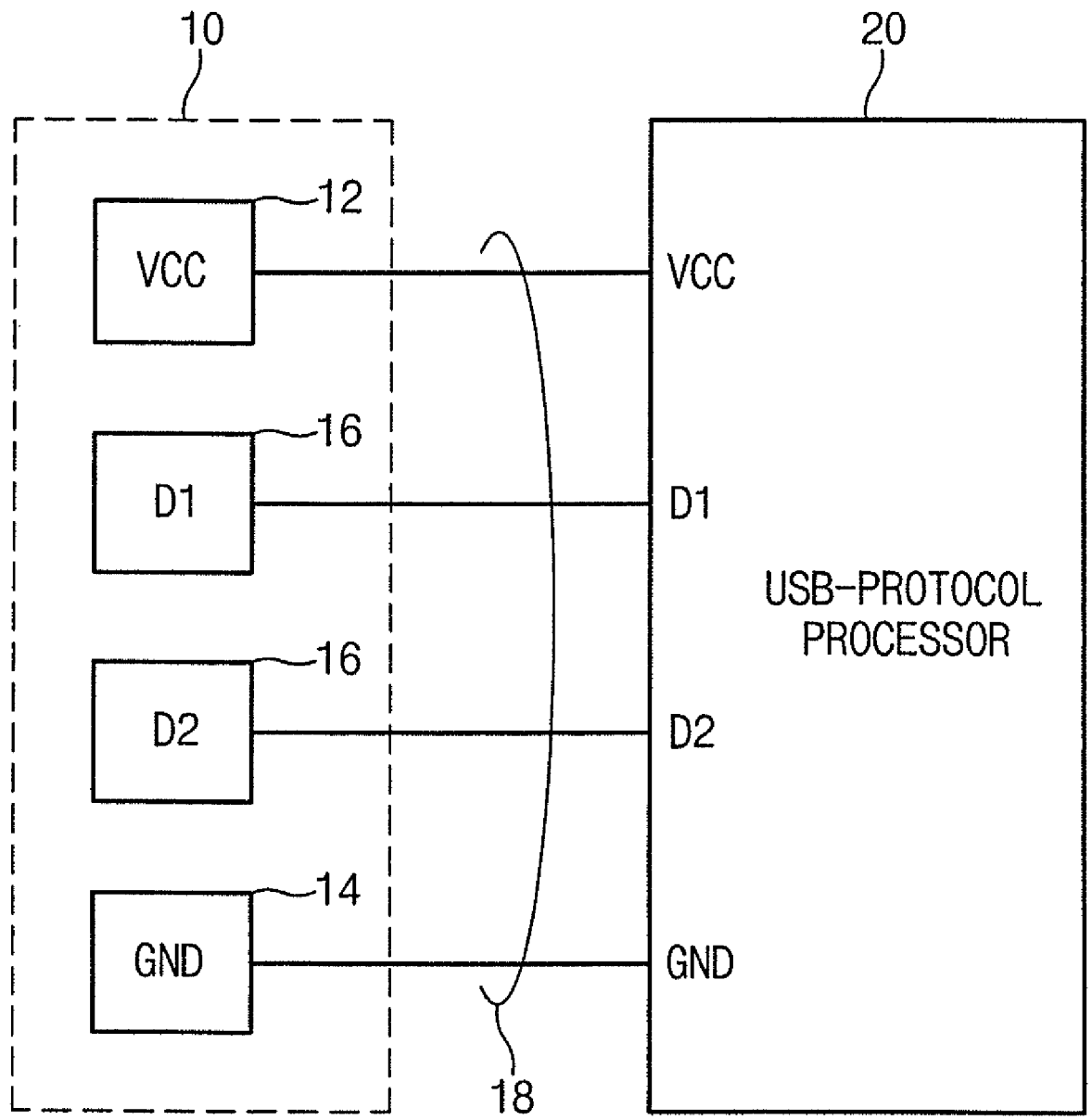
FIG. 1 is a diagram illustrating arrangement of port pins according to a USB method in the prior art.
Figure 2:
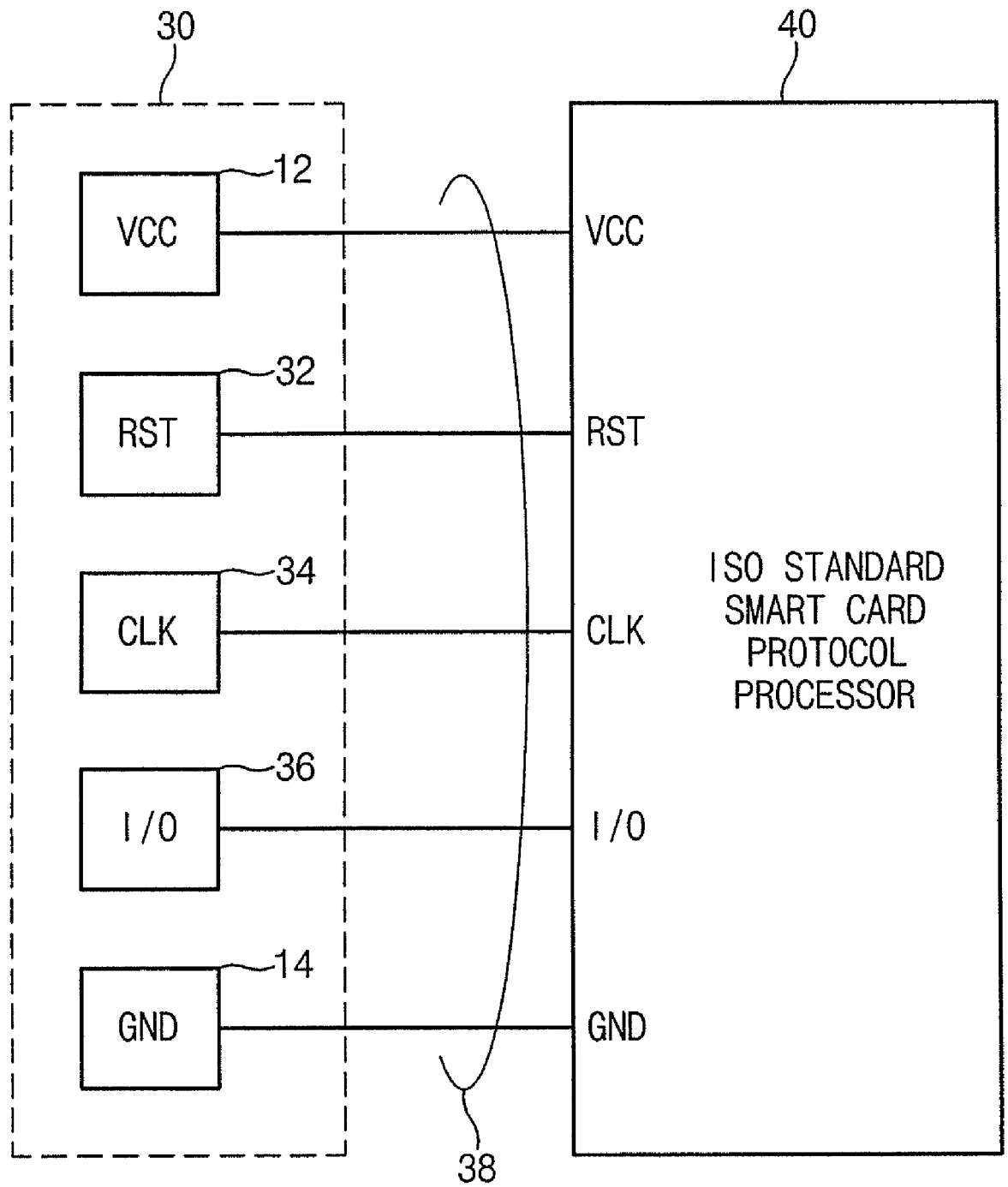
FIG. 2 is a diagram illustrating arrangement of port pins according to an ISO standard smart card method in the prior art.
Figure 3:
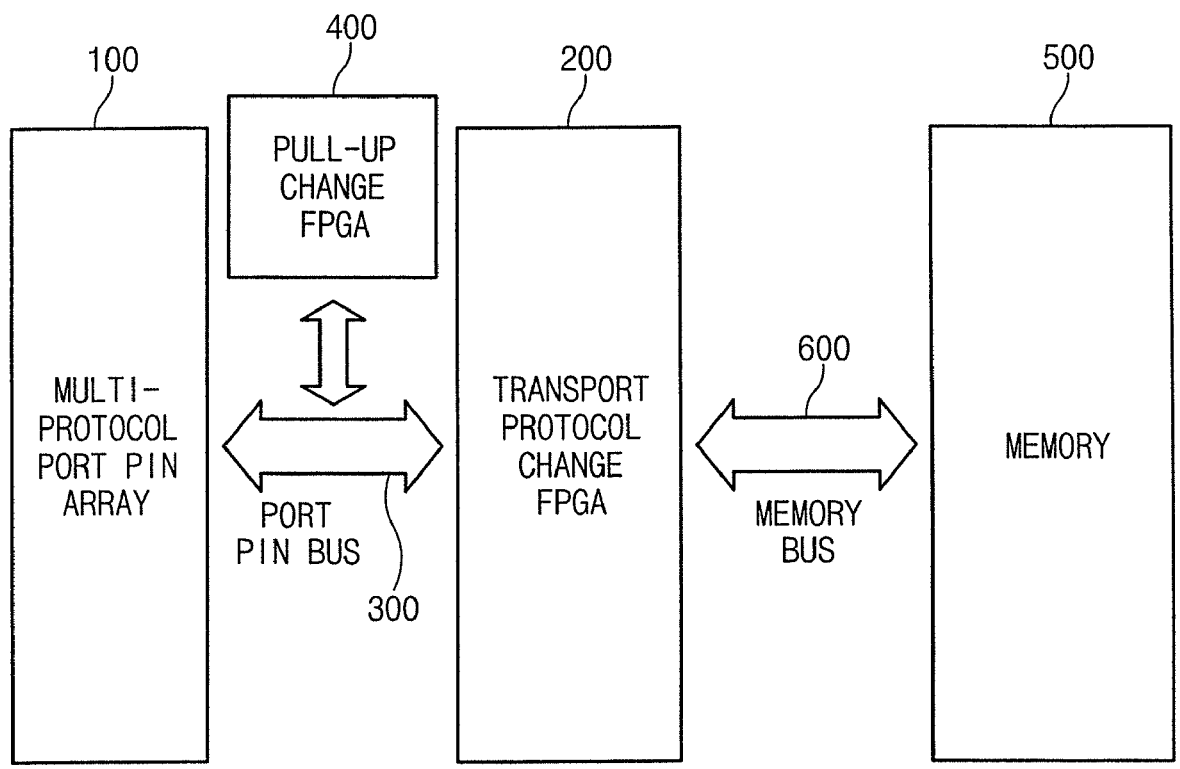
FIG. 3 is a diagram illustrating a multi-protocol serial interface system according to a first embodiment of the present invention.

FIG. 3 is a diagram illustrating a multi-protocol serial interface system according to a first embodiment of the present invention.

In an embodiment, the multi-protocol serial interface system comprises a multi-protocol port pin array 100, a transport protocol change FPGA 200, a port pin bus 300, a pull-up change FPGA 400, a memory 500 and a memory bus 600.

The multi-protocol port pin array 100 comprises a plurality of port pins interfacing with an external system to exchange data. Here, each port pin other than port pins VCC and GND for a power voltage and a ground voltage has its role which is not fixed but changed depending on a protocol applied to the system. For example, the same pin is used as a pin for exchanging data in a USB method, and as a pin for reset signals in an ISO standard smart card method.

The transport protocol change FPGA 200 which has a plurality of different programmed protocols (each comprising a protocol gate array logic circuit) determines roles of port pins of the multi-protocol port pin array 100 and processes data transmitted/received through the determined port pins depending on a protocol selected by changing a transport protocol circuit logic programmed in response to code data (program parameter) stored in a nonvolatile coding cell. The transport protocol change FPGA 200 comprises a plurality of I/O terminals connected one by one to the port pins of the multi-protocol port pin array 100. In the transport protocol change FPGA 200, signals inputted/outputted through each I/O terminal are programmed to vary depending on the applied protocol except the I/O terminals for a power voltage and a ground voltage. As a result, the rest port pins of the multi-protocol port pin array 100 except the port pins VCC and GND for a power voltage and a ground voltage have their roles which are not fixed but variably changed depending on program change of the transport protocol change FPGA 200.

The port pin bus 300 connects the multi-protocol port pin array 100 to the transport protocol change FPGA 200 to transmit data.

The pull-up change FPGA 400 regulates pull-up load on the port pins whose roles are varied depending on the applied protocol in the multi-protocol port pin array 100. That is, the pull-up regulation of the port pins should be changed when the roles of the port pins are changed by the transport protocol change FPGA 200. Therefore, when the protocol applied to the system is changed, the pull-up change FPGA 400 variably regulates the pull-up load of the port pins whose roles are varied. The pull-up change FPGA 400 comprises a plurality of load units, corresponding one by one to the port pins whose roles are varied, for regulating the pull-up operation of the port pins depending on the change of the protocol.

The memory 500 stores data transmitted and received with the external system. For the memory 500, a nonvolatile ferroelectric memory (FeRAM) is used which has smaller power consumption and whose processing speed is more rapid than a conventional EEPROM.

The memory bus 600 connects the transport protocol change FPGA 200 to the memory 500 to transmit data.

Figure 4:
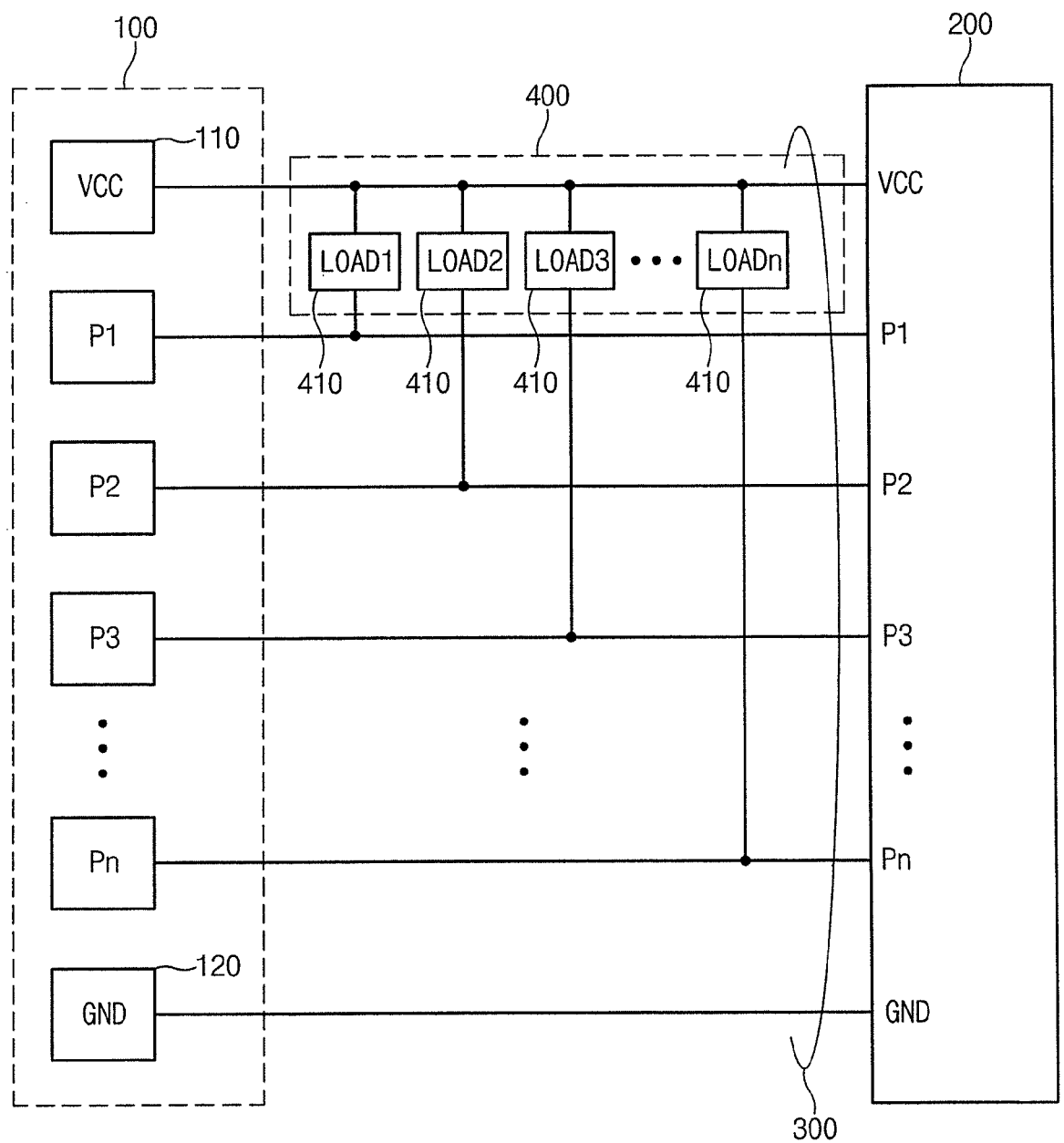
FIG. 4 is a diagram illustrating the connection relationship of a multi-protocol port pin array 100, a transport protocol change FPGA 200 and a pull-up change FPGA 400 in FIG. 3.

FIG. 4 is a diagram illustrating the connection relationship of a multi-protocol port pin array 100, a transport protocol change FPGA 200 and a pull-up change FPGA 400 in FIG. 3.

The multi-protocol port pin array 100 comprises a plurality of port pins VCC 110, GND 120 and P1~Pn which are connected to an external system to transmit and receive data.

Each of the pins is connected one by one to I/O terminals of the transport protocol change FPGA 200 through the port pin bus 300. Here, in the port pins of the multi-protocol port pin array 100 and their corresponding I/O terminals of the transport protocol change FPGA 200, the roles of the pins VCC 110 and GND 120 for a power voltage and a ground voltage are fixed regardless of the change of the protocol, and the roles of the rest port pins P1~P5 are changed depending on the applied protocol by the transport protocol change FPGA 200.

The pull-up change FPGA 400 comprises a plurality of load units 410 for applying the power voltage VCC to each of the port pin buses 300 and then pulling up the corresponding port pin bus 300.

Figure 5:
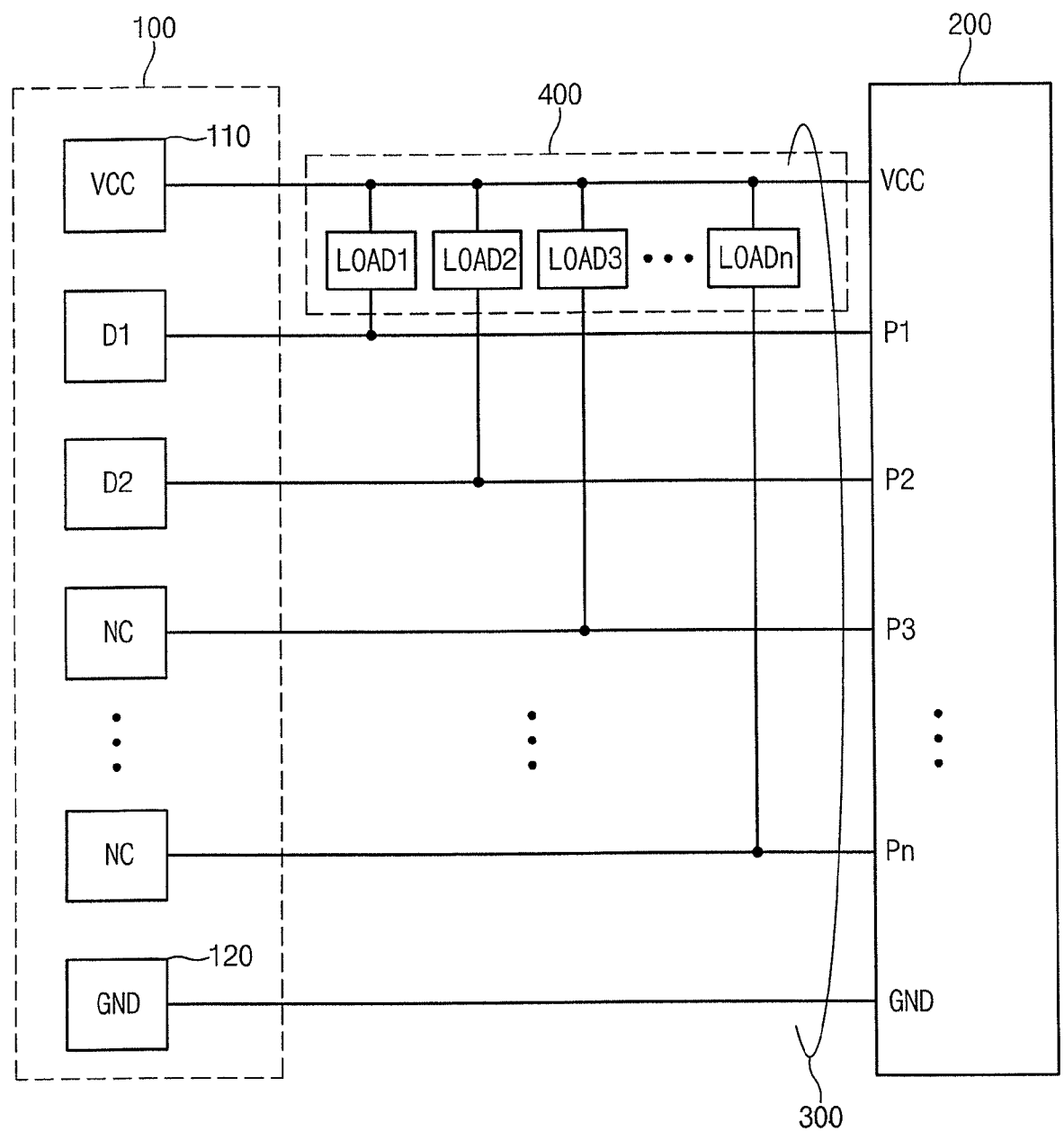
FIG. 5 is a diagram illustrating the connection relationship of the multi-protocol port pin array 100, the transport protocol change FPGA 200 and the pull-up change FPGA 400 of FIG. 3 in case of a USB method.

FIG. 5 is a diagram illustrating the connection relationship of the multi-protocol port pin array 100, the transport protocol change FPGA 200 and the pull-up change FPGA 400 of FIG. 3 in case of a USB method.

In the multi-protocol port pin array 100, only the power voltage pin VCC 110 and the ground voltage pin GND 120 are fixed. The port pins P1 and P2 are used as pins D1 and D2 for exchange data.

The transport protocol change FPGA 200 is programmed to exchange data through the I/O ports which are connected to the port pins P1 and P2. The rest port pins P3~Pn are not connected (NC).

Figure 6:
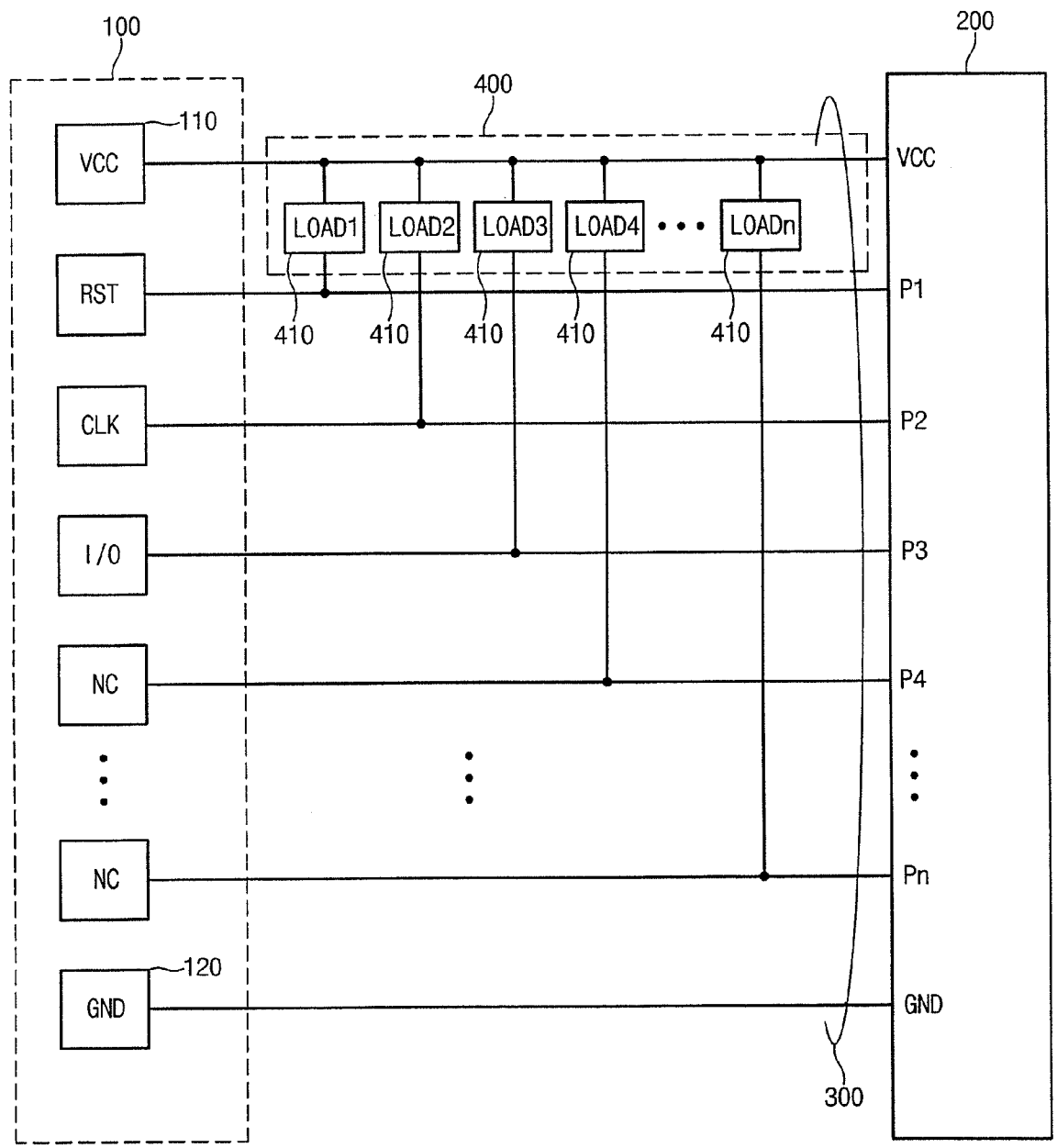
FIG. 6 is a diagram illustrating the connection relationship of the multi-protocol port pin array 100, the transport protocol change FPGA 200 and the pull-up change FPGA 400 of FIG. 3 in case of an ISO standard smart card method.

FIG. 6 is a diagram illustrating the connection relationship of the multi-protocol port pin array 100, the transport protocol change FPGA 200 and the pull-up change FPGA 400 of FIG. 3 in case of an ISO standard smart card method.

In the multi-protocol port pin array 100, only the power voltage pin VCC 110 and the ground voltage pin GND 120 are fixed. The port pins P1 and P2 are used as a reset signal pin RST and a clock signal pin CLK, respectively.

The transport protocol change FPGA 200 is programmed to receive a reset signal and a clock signal in the I/O terminals connected to the port pins P1 and P2, respectively, and to exchange data using the I/O terminal connected to the port pin P3. The rest port pins P4~Pn are not connected (NC).

Figure 7:
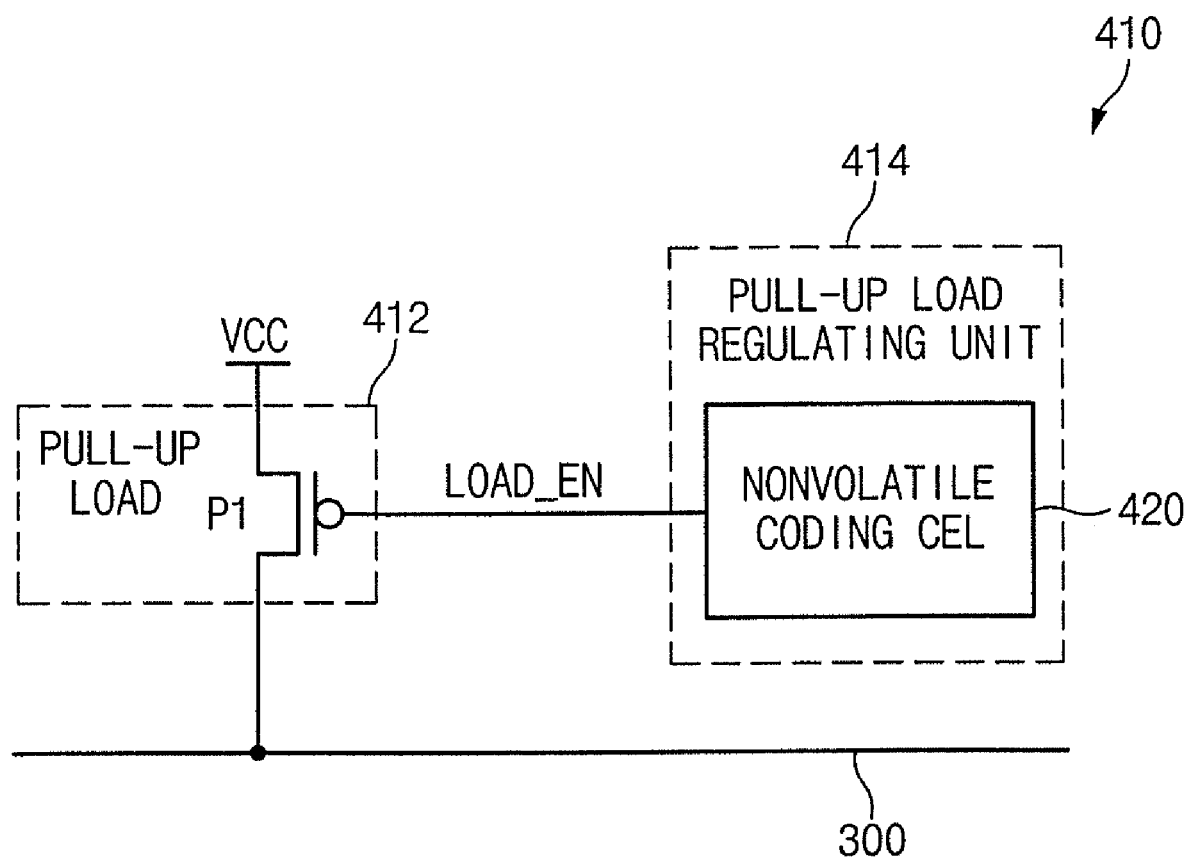
FIG. 7 is a diagram illustrating a load unit 410 of the pull-up change FPGA 400 of FIG. 4.

FIG. 7 is a diagram illustrating the load unit 410 of the pull-up change FPGA 400 of FIG. 4.

The load unit 410 comprises a pull-up load unit 412 and a pull-up load regulating unit 414.

The pull-up load unit 412, connected one by one to the port pin bus 300, selectively applies the power voltage VCC to the corresponding port pin bus 300 in response to a load enable signal LOAD_EN, thereby pulling up the port pin connected to the corresponding port pin bus 300. The pull-up load unit 412 comprises a PMOS transistor P1 which is connected between a power voltage VCC terminal and the corresponding port pin bus 300 and has a gate to receive the load enable signal LOAD_EN.

The pull-up load regulating unit 414 selectively activates the load enable signal LOAD_EN to regulate the pull-up operation of the corresponding port pin 300. The pull-up load regulating unit 414 which comprises a plurality of nonvolatile coding cells 420, stores code data varied depending on the protocol applied to the system. The stored code data is selectively activated as the load enable signal LOAD_EN.

Figure 8:
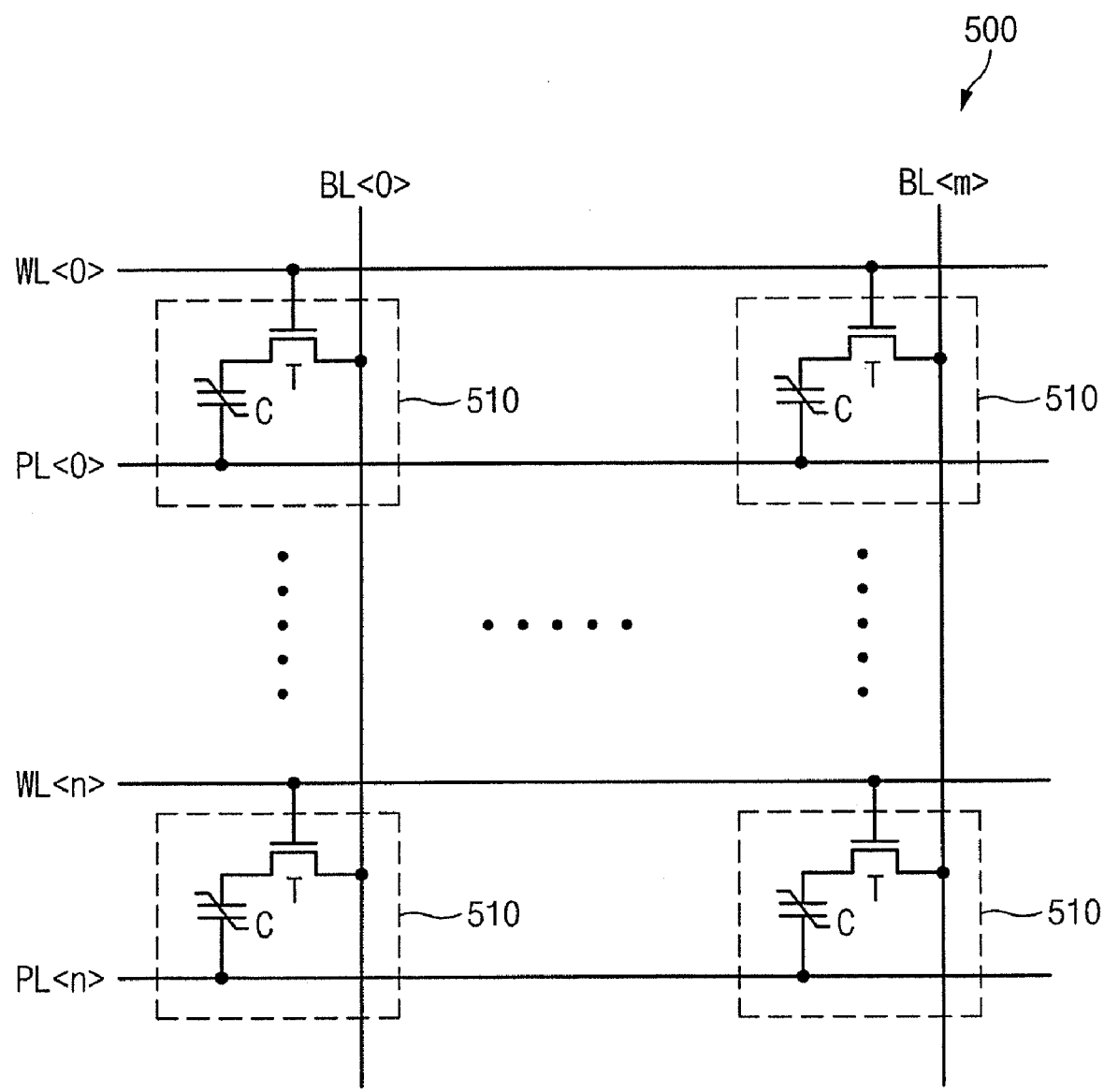
FIG. 8 is a circuit diagram illustrating a cell array structure of a memory 500 of FIG. 3.

FIG. 8 is a circuit diagram illustrating a cell array structure of the memory 500 of FIG. 3.

The memory 500 comprises a plurality of word lines WL<0>~WL<n> and a plurality of plate lines PL<0>~PL<n> which are arranged in parallel with each other and perpendicular to a plurality of bit lines BL<0>~BL<m>. Also, the memory 500 comprises a plurality of unit cells 510 for storing and outputting cell data in response to signals of the word lines WL<0>~WL<n> and the plates lines PL<0>~PL<n>.

Each unit cell 510 comprises one NMOS transistor T and one nonvolatile capacitor C. The NMOS transistor T, connected between the nonvolatile capacitor C and one of the bit lines BL<0>~BL<m>, has a gate connected to one of the word lines WL<0>~WL<n>. The nonvolatile capacitor C is connected between the NMOS transistor T and one of the plate lines PL<0>~PL<n>.

Figure 9:
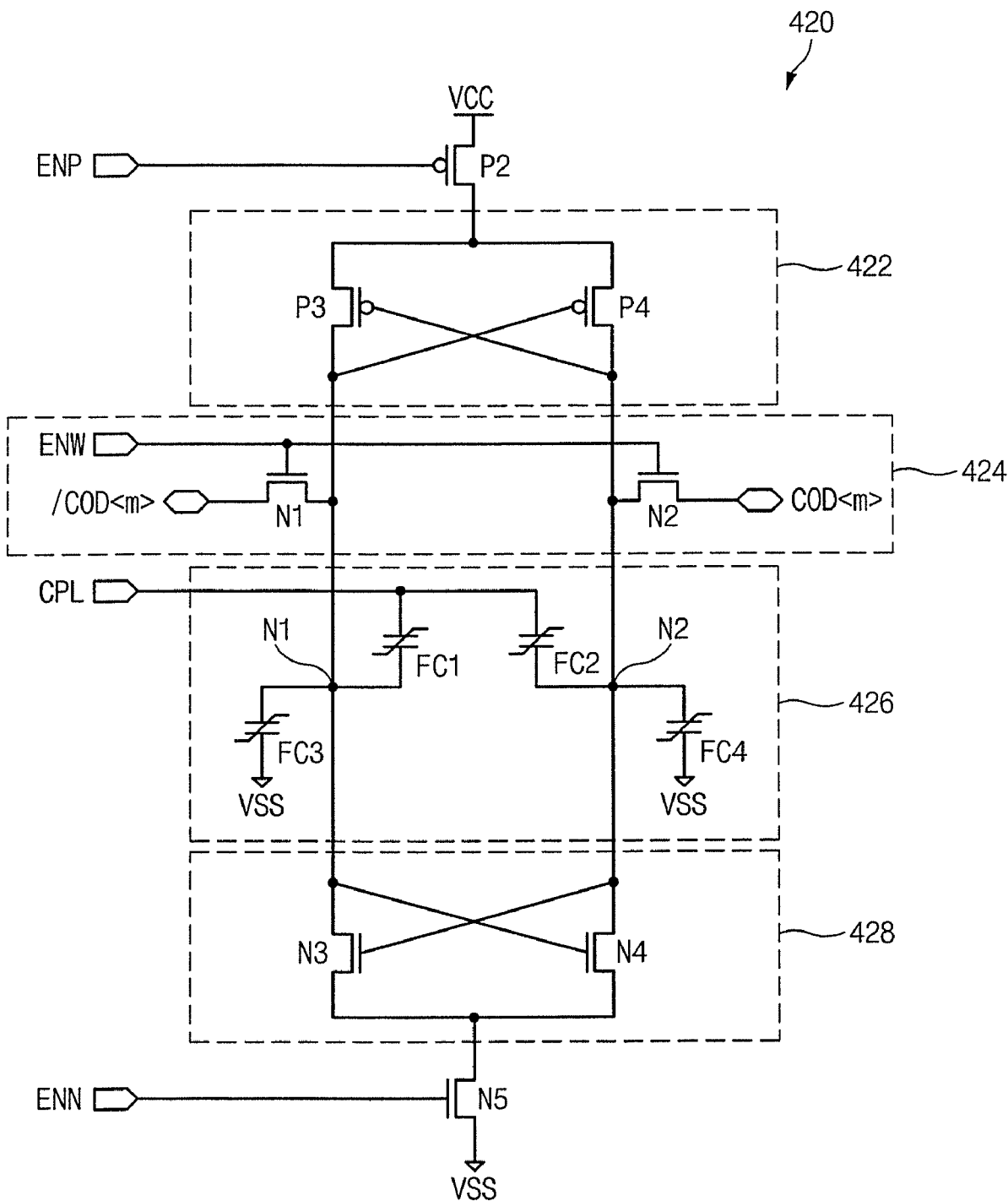
FIG. 9 is a circuit diagram illustrating the transport protocol change FPGA 200 of FIG. 3 and a nonvolatile coding cell 420 of a pull-up load regulating unit 414 of FIG. 7.

FIG. 9 is a circuit diagram illustrating the transport protocol change FPGA 200 of FIG. 3 and the nonvolatile coding cell 420 of a pull-up load regulating unit 414 of FIG. 7.

The nonvolatile coding cell 420 comprises a pull-up switch P2, a pull-up driving unit 422, a data I/O unit 424, a ferroelectric capacitor unit 426, a pull-down driving unit 428 and a pull-down switch N5.

The pull-up switch P2 comprises a PMOS transistor which is connected between the power voltage VCC terminal and the pull-up driving unit 422 and has a gate to receive a pull-up enable signal ENR. When the pull-up enable signal ENP is activated, the pull-up switch P2 applies the power voltage VCC to the pull-up driving unit 422.

The pull-up driving unit 422 which drives the power voltage VCC applied from the pull-up switch P2 comprises PMOS transistors P3 and P4 connected between the pull-up switch P2 and the data I/O unit 424 with a latch structure.

The data I/O unit 424 inputs and outputs the code data COM<m> and /COD<m> in response to a write enable signal ENW. The data I/O unit 424 comprises NMOS transistors N1 and N2 which are connected between both output terminals and both storage nodes N1 and N2 respectively, and have gates to receive the write enable signal ENW. Meanwhile, when the coding cell is used in the pull-up load regulating unit 414, the code data /COD<m> and COD<m> are load enable signals /LOAD_EN and LOAD_EN.

The ferroelectric capacitor unit 426 generates a voltage difference in both storage nodes N1 and N2 in response to a cell plate signal CPL, thereby storing the code data COM<m> and /COD<m> applied through the data I/O unit 424.

The pull-down driving unit 418 which drives the ground voltage GND applied from the pull-down switch N5 comprises NMOS transistors N3 and N4 connected between the ferroelectric capacitor unit 426 and the pull-down switch N5 with a latch structure.

The pull-down switch N5 comprises a NMOS transistor which has a gate to receive a pull-down enable signal ENN, thereby selectively connecting the pull-down driving unit 428 to the ground voltage GND terminal. When the pull-down enable signal ENN is activated, the pull-down switch N5 applies a ground voltage VSS to the pull-down driving unit 428.

Charges stored in ferroelectric capacitors FC1 and FC2 generate a voltage difference in the storage nodes N1 and N2 by capacitance load of ferroelectric capacitors FC3 and FC4 when the cell plate signal CPL is applied as a high level. Here, the cell plate signal CPL transits to 'high' by a power-up detection pulse generated when power reaches a stable level. When a sufficient voltage difference is generated in the storage nodes N1 and N2 of the coding cell 420, the pull-up enable signal ENP and the pull-down enable signal ENN are activated as a low level and a high level, respectively, thereby amplifying data of both output terminals. After amplification is complicated, the cell plate signal CPL is transited into 'low', and destroyed high data of the ferroelectric capacitors FC1 or FC2 are restored.

Figure 10:
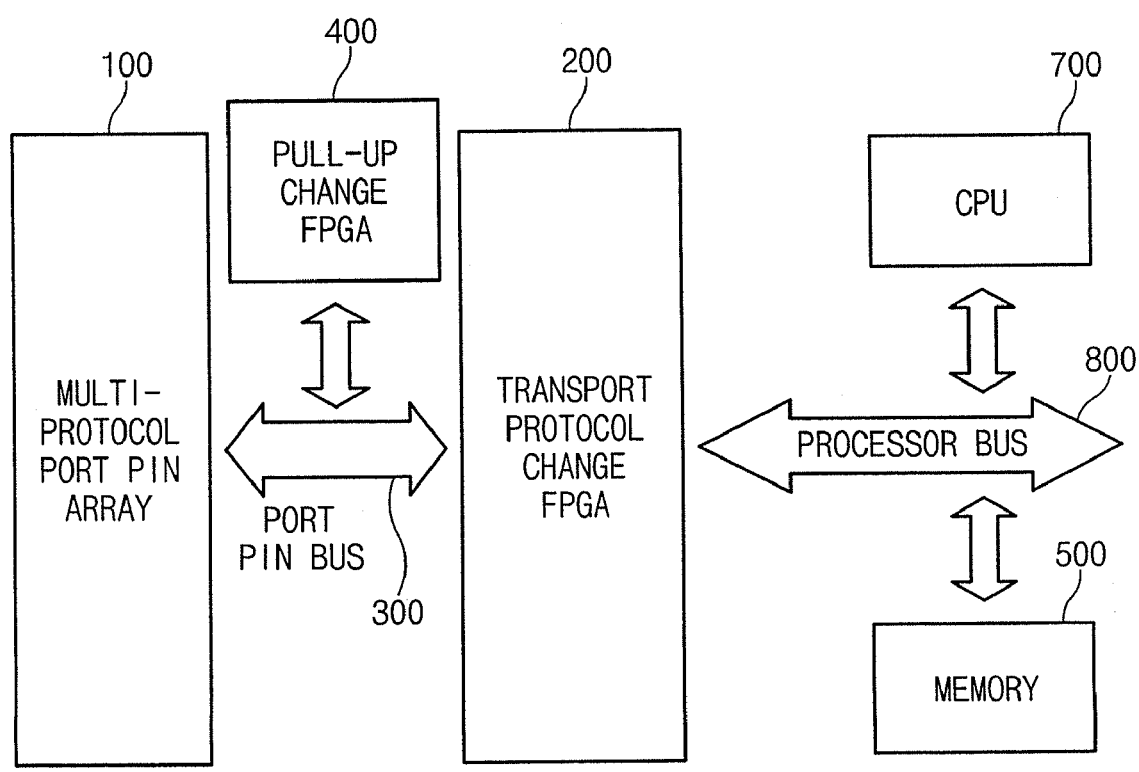
FIG. 10 is a diagram illustrating a multi-protocol serial interface system according to a second embodiment of the present invention.

FIG. 10 is a diagram illustrating a multi-protocol serial interface system according to a second embodiment of the present invention.

In comparison with the above-described first embodiment, the multi-protocol serial interface system of the second embodiment further comprises a CPU 700 for processing data received from the external system and stored in the memory 500 and data to be transmitted to the external system and stored in the memory 500.

In the above-described first embodiment, an additional data processing device is required to process and output data received from the external system and data to be transmitted to the external system and stored in the memory 500 as a specific type that user desires. However, the multi-protocol serial interface system of the second embodiment comprises the CPU 700 for processing transport data depending on a predetermined logic to perform a self-process on the data in the multi-protocol serial interface system.

The transport protocol change FPGA 200, the memory 500 and the CPU 700 share a processor bus 800 to transmit data.

Since the multi-protocol serial interface system of FIG. 10 has the same elements as that of FIG. 3 except the CPU 700, the same reference numbers of FIG. 3 are used in FIG. 10 and the explanation on the same elements is omitted.

As described above, a multi-protocol serial interface system according to an embodiment of the present invention variably regulates roles of port pins connected to an external system in transmission/reception of serial data using a FPGA, so that one interface system is applied to various kinds of protocols.

While the invention is susceptible to various modifications and alternative forms, specific embodiments have been shown by way of example in the drawings and described in detail herein. However, it should be understood that the invention is not limited to the particular forms disclosed. Rather, the invention covers all modifications, equivalents, and alternatives falling within the spirit and scope of the invention as defined in the appended claims.

The invention claimed is:

1. A multi-protocol serial interface system comprising:
   a multi-protocol port pin array comprising a plurality of port pins, wherein the plurality of port pins compatibly interface with a plurality of external systems, wherein each of a plurality of the port pins is used in a plurality of serial communication methods;
   a transport protocol change Field Protocol Gate Array (FPGA), wherein a plurality of different transport protocols are preconfigured with a protocol gate array logic circuit, and when one transport protocol is selected, the transport protocol change FPGA is connected with the port pins of the multi-protocol port pin array depending on the selected protocol without externally receiving an additional transport protocol; and
   a pull-up change FPGA for regulating a pull-up load of the port pins connected with the transport protocol change FPGA.

2. The multi-protocol serial interface system according to claim 1, wherein roles of the port pins of the multi-protocol port pin array are changed depending on the protocol selected in the transport protocol change FPGA.

3. The multi-protocol serial interface system according to claim 1, wherein the transport protocol change FPGA selects a protocol depending on code data stored in a plurality of coding cells.

4. The multi-protocol serial interface system according to claim 3, wherein the coding cell comprises a register for storing data with a nonvolatile capacitor.

5. The multi-protocol serial interface system according to claim 1, wherein the transport protocol change FPGA is connected with a port pin interfacing with the external system among the port pins of the multi-protocol port pin array in response to code data stored in the plurality of coding cells.

6. The multi-protocol serial interface system according to claim 5, wherein the coding cell comprises a register for storing data with a nonvolatile capacitor.

7. The multi-protocol serial interface system according to claim 1, wherein the transport protocol change FPGA is programmed so that input/output terminals for a power voltage and a ground voltage are fixed as a specific terminal regardless of a kind of selected protocol.

8. The multi-protocol serial interface system according to claim 1, wherein the pull-up change FPGA comprises a plurality of coding cells for storing pull-up load regulating data to regulate pull-up load of the port pins connected with the transport protocol change FPGA; and
   a load unit for regulating pull-up load of the corresponding port pins in response to the pull-up load regulating data.

9. The multi-protocol serial interface system according to claim 8, wherein the coding cell comprises a register for storing data with a nonvolatile capacitor.

10. The multi-protocol serial interface system according to claim 8, wherein the load unit is a MOS transistor for applying a power voltage to the corresponding port pin in response to the pull-up load regulating data.

11. A multi-protocol serial interface system comprising:
   a multi-protocol port pin array comprising a plurality of port pins, wherein the plurality of port pins compatibly interface with a plurality of external systems, wherein each of a plurality of the port pins is used in a plurality of serial communication methods;
   a plurality of protocol change FPGAs, wherein each of the protocol change FPGAs is preconfigured with a different protocol gate array logic circuit, and one of the protocol change FPGAs is selected to process data received through the port pins of the multi-protocol port pin array without externally receiving an additional transport protocol;
   a plurality of registers for selectively connecting the port pins interfacing with the external system among the port pins of the multi-protocol port pin array with the selected protocol change FPGA; and
   a pull-up change FPGA for regulating pull-up load of the port pins connected with the transport protocol change FPGA.

12. The multi-protocol serial interface system according to claim 11, wherein roles of the port pins of the multi-protocol port pin array are changed depending on the selected protocol change FPGA.

13. The multi-protocol serial interface system according to claim 11, wherein the protocol change FPGA is selected depending on code data stored in a plurality of coding cells.

14. The multi-protocol serial interface system according to claim 13, wherein the coding cell comprises a register for storing data with a nonvolatile capacitor.

15. The multi-protocol serial interface system according to claim 11, wherein the protocol change FPGA is programmed so that input/output terminals for a power voltage and a ground voltage are fixed as a specific terminal.

16. The multi-protocol serial interface system according to claim 11, wherein the pull-up change FPGA comprises:
   a plurality of coding cells for storing pull-up load regulating data to regulate pull-up load of the port pins connected with the selected protocol change FPGA; and
   a load unit for regulating pull-up load of the corresponding port pins in response to the pull-up load regulating data.

17. The multi-protocol serial interface system according to claim 16, wherein the coding cell comprises a register for storing data with a nonvolatile capacitor.

18. The multi-protocol serial interface system according to claim 16, wherein the load unit is a MOS transistor for applying a power voltage to the corresponding port pin in response to the pull-up load regulating data.

* * * * *